United States Patent Office 2,777,854
Patented Jan. 15, 1957

2,777,854
PROCESS FOR THE PRODUCTION OF ORGANIC AMINO DIOLS

William H. Edgerton, Huntington Woods, and James R. Fisher, Royal Oak, Mich., assignors to Parke, Davis & Company, Detroit, Mich., a corporation of Michigan No Drawing. Application December 27, 1954, Serial No. 477,915

15 Claims. (Cl. 260—307)

This invention relates to a process for the production of organic amino diols. More particularly, the invention relates to a process for the production of amino diols having in their free base form the formula,

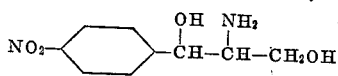

From the following description it will be apparent to those skilled in the art that the amino diol products of the invention, as well as the starting materials and novel intermediates, can exist in structural as well as optical isomeric form. The term "structural" isomer or form as used herein refers to the cis or trans relationship, that is, the planar relationship of the polar groups on the two asymmetric carbon atoms. In order to differentiate between these two possible diastereoisomers we will subsequently refer whenever appropriate to the cis compounds as the "erythro" series or form and to the trans disastereoisomers as the "threo" series or form. Such cis compounds are products wherein the two most highly polar of the groups on the asymmetric carbon atoms lie on the same side of the plane of the two carbon atoms. Conversely, the trans or threo compounds are those wherein the two most highly polar groups lie on opposite sides of the plane of the two carbon atoms.

Both the erythro and threo forms exist as racemates of the optically active dextro (+) and levo (−) rotatory isomers as well as in the form of the individual or separated dextro (+) and levo (−) optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula the formula is to be interpreted in its generic sense, that is, as representing an individual threo or erythro optical isomer in separated form as well as threo or erythro optical racemates or the total unresolved mixture of structural and optical isomers. Such a formula does not merely represent the unresolved mixture of isomers.

The process of the invention comprises reacting a 1-aza-4-phenyl-3,7-dioxabicyclo[3.3.0]octane compound of formula,

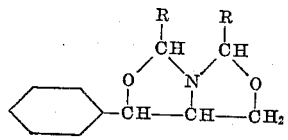

with a nitrating agent to obtain a 1-aza-4-(p-nitrophenyl)-3,7-dioxabicyclo[3.3.0]octane compound, and subjecting the 1-aza-4-(p-nitrophenyl)-3,7-dioxabicyclo[3.3.0]octane compound to hydrolysis to obtain an amino diol compound having in its free base form the formula,

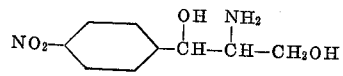

where R represents a hydrogen, alkyl, aralkyl, aryl, nitroaralkyl or nitroaryl radical. The transformations involved in the process can be diagrammatically illustrated as follows:

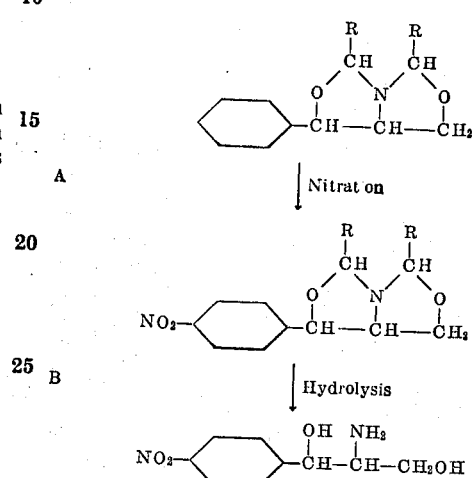

where R has the same significance as given above.

The first step in the process (A in the above diagram) is carried out by reacting the 1-aza-4-phenyl-3,7-dioxabicyclo[3.3.0]octane compound with a nitrating agent in the cold. Among the common nitrating agents which may be employed are 100% nitric acid, fuming nitric acid and "mixed acid," the latter being a mixture of concentrated nitric and sulfuric acids. Of the agents mentioned, fuming nitric acid is preferred, and it is also preferred to carry out the nitration step in the presence of a dehydrating agent such as an acid anhydride. The preferred temperature for nitration is in the neighborhood of −15 to −20° C. but in practice a relatively wide range of temperature is permissible. In general, temperatures within the range of 25 to −50° C. are satisfactory. The resulting reaction mixture containing the product of nitration having the above formula can be subjected to the hydrolysis step without further purification, or if desired, the nitration product can be conveniently isolated in pure form by neutralizing and extracting the reaction mixture with a water-immiscible organic solvent, concentrating to a small volume and recrystallizing the residue from a suitable solvent.

The second step in the process (B in the above diagram) is carried out by reacting the 1-aza-4-(p-nitrophenyl)-3,7-dioxabicyclo[3.3.0]octane compound obtained in the first step with an acidic or alkaline hydrolytic agent. The use of a dilute aqueous hydrolytic agent is preferred. If desired, the hydrolysis may be carried out in a medium containing a water-miscible organic solvent such as methanol, ethanol, dioxane, acetone, n-propanol and methyl ethyl ketone. When acidic hydrolytic conditions are employed the 1-p-nitrophenyl-2-aminopropane-1,3-diol product is present in the reaction mixture in the form of an acid addition salt and either it can be isolated in this form or it can be neutralized and isolated as the free base. The reaction may be effected over a wide temperature range but is preferably carried out at the boiling point of the reaction mixture. Some specific examples of acidic hydrolytic agents which can be employed are hydrochloric acid, hydrobromic acid, hydriodic acid, and sulfuric acid; mineral acids in general are satisfactory.

Among the many alkaline agents which can be employed are the alkali and alkaline earth metal hydroxides, oxides, carbonates, amides, alkoxides and phenolates; quaternary ammonium hydroxides and strong tertiary organic nitrogen bases. When alkaline hydrolytic agents are employed, the 1-p-nitrophenyl-2-aminopropane-1,3-diol product is present in the reaction mixture in the free base form. It can be isolated as such or preferably it can be treated with acid and isolated in acid addition salt form.

The products of the process are useful as intermediates in the preparation of organic compounds which possess antibiotic activity against micro-organisms of the Rickettsia type. As an instance of such use as an intermediate, the product D-(−)-threo-1-p-nitrophenyl-2-aminopropane-1,3-diol can be converted by N-dichloroacetylation to the antibiotic chloroamphenicol.

The invention is illustrated by the following examples.

*Example 1*

3 grams of D-(+)-threo-1-aza-2,4,8-triphenyl-3,7-dioxabicyclo[3.3.0]octane is added in small portions to 30 ml. of fuming nitric acid. During addition, the temperature of the reaction mixture is maintained in the range from −15 to −20° C. The mixture is allowed to stand at −5° C. until solution is complete and is then poured onto crushed ice, neutralized with sodium carbonate solution and extracted successively with small portions of ethyl acetate. The extracts are dried over anhydrous sodium sulfate, filtered and evaporated to dryness in vacuo. The residue is taken up in 30 ml. of 10% hydrochloric acid and the mixture is heated under reflux for one-half hour and evaporated to dryness in vacuo. The residue is taken up in 150 ml. of water, extracted portionwise with ether and the aqueous phase is made alkaline with sodium hydroxide solution. The alkaline solution is extracted with ethyl acetate and the extracts are dried and evaporated to obtain the desired D-(−)-threo-1-p-nitrophenyl-2-aminopropane-1,3-diol; M. P. 162° C. This product has the formula

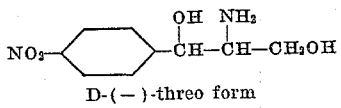

D-(−)-threo form

The starting material, D-(+)-threo-1-aza-2,4,8-triphenyl-3,7-dioxabicyclo[3.3.0]octane, can be prepared as follows: A mixture of 33.4 g. of D-(−)-threo-1-phenyl-2-aminopropane-1,3-diol, 46 g. of benzaldehyde and 350 ml. of benzene is refluxed for 12 hours over a water trap. Benzene is taken off by distillation in vacuo and the residual syrup is purified by recrystallization from ethanol; M. P. 74–75° C., $[\alpha]_D^{26}=+45°$ (c.=2% in ethyl acetate).

*Example 2*

3 grams of D-(−)-threo-1-aza-2,8-di-(n-hexyl)-4-phenyl-3,7-dioxabicyclo[3.3.0]octane is added slowly to a mixture of 30 ml. of fuming nitric acid and 2 ml. of acetic anhydride at a temperature of −15 to −20° C. The mixture is allowed to stand for ten minutes and is then poured onto crushed ice, neutralized with sodium carbonate solution and extracted with ethyl acetate. The extracts are dried over anhydrous sodium sulfate, filtered and concentrated by distillation in vacuo to a small volume. The residual syrup is taken up in 100 ml. of acetone and 50 ml. of 5% sodium hydroxide solution is added. The mixture is heated at 50–55° C. for one-half hour and is then cooled to room temperature and acidified with dilute hydrochloric acid. The acidified mixture is concentrated to about 50 ml. by distillation in vacuo and washed portionwise with 50 ml. of ether. The resulting concentrate is made alkaline with sodium hydroxide solution and is extracted with ethyl acetate. The ethyl acetate is evaporated from the extract in vacuo to obtain the product, D-(−)-threo-1-p-nitrophenyl-2-aminopropane-1,3-diol.

The starting material, D-(−)-threo-1-aza-2,8-di-(n-hexyl)-4-phenyl-3,7-dioxabicyclo[3.3.0]octane, can be prepared as follows: A mixture of 33.4 g. of D-(−)-threo-1-phenyl-2-aminopropane-1,3-diol, 48 g. of n-heptaldehyde and 250 ml. of benzene is refluxed for 11 hours over a water trap. The reaction mixture is filtered and fractionally distilled in vacuo. The fraction boiling at 198–204° C. (1.5–1.8 mm.) is the desired starting material.

*Example 3*

(a) 3 grams of D-(+)-threo-1-aza-2,4,8-triphenyl-3,7-dioxabicyclo[3.3.0]octane, prepared as described under Example 1, is added in small portions to 30 ml. of fuming nitric acid while maintaining the reaction temperature in the range between −15 to −20° C. The mixture is allowed to stand at −5° C. until solution is complete and is then poured onto crushed ice. The mixture is neutralized with sodium carbonate solution, extracted with ethyl acetate and the extracts are washed with water, dried over anhydrous sodium sulfate and filtered. The ethyl acetate is removed by distillation in vacuo. The residual syrup which is largely D-(−)-threo-1-aza-2,4,8-tri-(p-nitrophenyl)-3,7-dioxabicyclo[3.3.0]octane is obtained in pure form by washing with ether, extracting in hot benzene, adding isooctane to cause precipitation of a solid and crystallizing the solid from absolute methanol, 152–155° C.; $[\alpha]_D^{26}=-46°$ (c.=0.5% in ethyl acetate). This product has the formula,

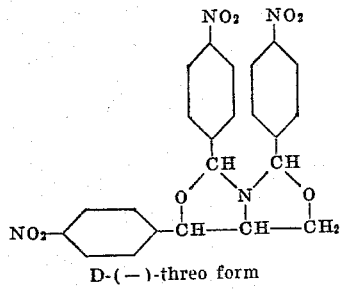

D-(−)-threo form (b) The product of (a) is heated on a steam bath for one-half hour with 30 ml. of 1 N sulfuric acid. The reaction mixture is evaporated to dryness in vacuo and the residual sulfuric acid addition salt of D-(−)-threo-1-p-nitrophenyl-2-aminopropane-1,3-diol is taken up in water and extracted with ether. The aqueous phase is made alkaline with dilute sodium hydroxide solution and is extracted with several portions of ethyl acetate. The ethyl acetate extracts are dried and the ethyl acetate removed by distillation to obtain the product, D-(−)-threo-1-p-nitrophenyl-2-aminopropane-1,3-diol.

*Example 4*

(a) 8.9 grams of D-(+)-threo-1-aza-4-phenyl-3,7-dioxabicyclo[3.3.0]octane is added portionwise to 90 ml. of fuming nitric acid maintained at −20° C. The mixture is allowed to stand at this temperature for about ten minutes and is then poured onto crushed ice. The mixture is neutralized with sodium carbonate solution, extracted wih ethyl acetate, and the combined extracts are washed with water, dried over anhydrous sodium sulfate, filtered and concentrated by distillation in vacuo. The residual syrup is extracted with successive portions of isooctane. After standing the isooctane extracts are decanted from the syrup which separates. Crystallization of the separated syrup from ethanol yields the desired D-(+)-threo-1-aza-4-p-nitrophenyl-3,7-dioxabicyclo[3.3.0]octane; M. P. 77° C., $[\alpha]_D^{26}=+38.5°$ (2% in ethyl acetate). This product has the formula,

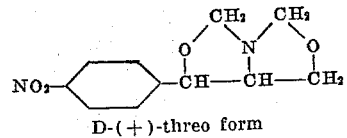

D-(+)-threo form (b) The product of (a) is heated on a steam bath for one-half hour with 50 ml. of 5% aqueous isopropanol which has been saturated with hydrogen chloride. The reaction mixture is concentrated to about 15 ml. and is then cooled to room temperature. The product which separates on standing, D-(—)-threo-1-p-nitrophenyl-2-aminopropane-1,3-diol, hydrochloride, is collected and purified by recrystallization from ethanol. This product has the formula,

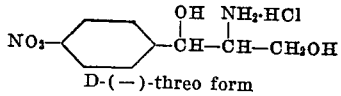

D-(—)-threo form

The starting material for (a) above can be prepared as follows: A mixture of 41.8 g. of D-(—)-threo-1-phenyl-2-aminopropane-1,3-diol and 16.5 g. of paraformaldehyde in 500 ml. of benzene is refluxed over a water trap for one hour. The reaction mixture is filtered and concentrated by evaporation in vacuo. The residual oil is purified by fractional distillation; the fraction distilling at 138° C. (3.3 mm.) is the desired starting material, D-(+)-threo-1-aza-4-phenyl-3,7-dioxabicyclo[3.3.0]octane.

*Example 5*

(a) 10 grams of D-(+)-threo-1-aza-2,8-di-(p-nitrophenyl)-4-phenyl-3,7-dioxabicyclo[3.3.0]octane is added in small portions to 100 ml. of fuming nitric acid with vigorous stirring while the temperature is maintained in the range from —15 to —20° C. After standing at —20° C. for ten minutes, the reaction mixture is poured onto crushed ice, neutralized with sodium carbonate solution and extracted portionwise with ethyl acetate. The extracts are washed with water, dried over anhydrous sodium sulfate, filtered and concentrated in vacuo. The residual syrup is washed with boiling ether, dissolved in hot benzene and filtered. An excess of isooctane is added to the filtrate to cause precipitation of a gum which is isolated and recrystallized first from ethanol and then from methanol. The product, D-(—)-threo-1-aza-2,4,8-tri-(p-nitrophenyl)-3,7-dioxabicyclo[3.3.0]octane, has the formula,

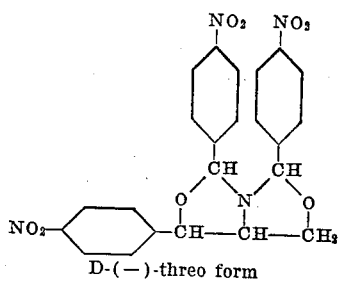

D-(—)-threo form (b) The product of (a) is heated under reflux for one-half hour with 30 ml. of 10% hydrochloric acid. The reaction mixture is evaporated to dryness in vacuo, the residue is taken up in water, extracted with ether and the aqueous phase is then taken to dryness to obtain the desired D-(—)-threo-1-p-nitrophenyl-2-aminopropane-1,3-diol, hydrochloride, which has the formula,

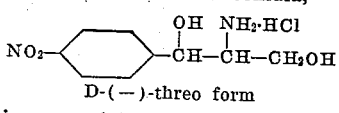

D-(—)-threo form

The starting material for (a) above can be prepared as follows: A mixture of 16.7 g. of D-(—)-threo-1-phenyl-2-aminopropane-1,3-diol and 33 g. of p-nitrobenzaldehyde in 250 ml. of benzene is refluxed for about 20 hours over a water trap. Benzene is removed by distillation in vacuo and the residual solid is purified by washing with isooctane, drying and recrystallizing from ethylene chloride and alcohol; M. P. 157–158° C., $[\alpha]_D^{26} = +58°$ (c.=1.65% in ethyl acetate). This product is the desired starting material, D-(+)-threo-1-aza-2,8-di-(p-nitrophenyl)-4-phenyl-3,7-dioxabicyclo[3.3.0]octane.

*Example 6*

(a) 9 grams of DL-threo-1-aza-4-phenyl-3,7-dioxabicyclo[3.3.0]octane, prepared from DL-threo-1-phenyl-2-aminopropane-1,3-diol by the method described under Example 4 for the preparation of the D-(+)-threo isomer, is added portionwise to 90 ml. of fuming nitric acid maintained at —20° C. The mixture is allowed to stand at this temperature for about ten minutes and is then poured onto crushed ice. The mixture is neutralized with sodium carbonate solution, extracted with ethyl acetate, and the combined extracts are washed with water, dried over anhydrous sodium sulfate, filtered and concentrated by distillation in vacuo. The residual syrup is extracted with successive portions of isooctane. After standing, the isooctane extracts are decanted from the syrup which separates. The desired DL-threo-1-aza-4-p-nitrophenyl-3,7-dioxabicyclo[3.3.0]octane is obtained from the syrup by recrystallization from ethanol. The product has the formula,

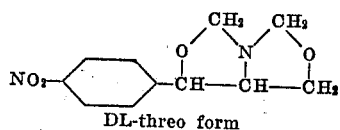

DL-threo form (b) The product of (a) is taken up in 30 ml. of 10% hydrochloric acid and the mixture is heated under reflux for one-half hour and is then evaporated to dryness in vacuo. The residue is taken up in 150 ml. of water and the mixture is made alkaline with sodium hydroxide solution. The alkaline solution is extracted with ethyl acetate and the extracts are dried and distilled to obtain the desired DL-threo-1-p-nitrophenyl-2-aminopropane-1,3-diol. This product has the formula,

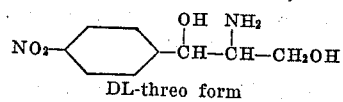

DL-threo form (c) The corresponding erythro structural isomer can be produced in the same manner employed in (a) and (b) starting with 9 grams of DL-erythro-1-aza-4-phenyl-3,7-dioxabicyclo[3.3.0]octane, prepared from DL-erythro-1-phenyl-2-aminopropane-1,3-diol by a method corresponding to that described under Example 4 for the preparation of the D-(+)-threo isomer. The product prepared in accordance with (a) starting with the erythro isomer is DL-erythro-1-aza-4-p-nitrophenyl-3,7-dioxabicyclo[3.3.0]octane which has the formula,

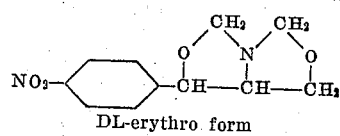

DL-erythro form from which in accordance with (b) there is obtained by acidic hydrolysis and neutralization the desired DL-erythro-1-p-nitrophenyl-2-aminopropane-1,3-diol which has the formula,

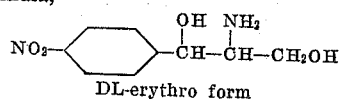

DL-erythro form

In general, the 1-aza-4-phenyl-3,7-dioxabicyclo[3.3.0]-octane starting materials employed in the process of the invention can be prepared by applying the methods described under Examples 1, 2, 4 and 5 involving the condensation of aldehyde R—CHO with a 1-phenyl-2-aminopropane-1,3-diol, R having the above-mentioned significance.

We claim:

1. Process for the production of nitrophenyl amino diol compounds, which comprises reacting a 1-aza-4-phenyl-3,7-dioxabicyclo[3.3.0]octane compound of formula,

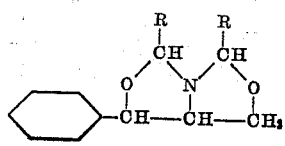

with nitric acid under anhydrous conditions at a temperature below about 25° C. to obtain a 1-aza-4-(p-nitrophenyl)-3,7-dioxabicyclo[3.3.0]octane compound, and subjecting the compound so obtained to hydrolysis with a dilute aqueous mineral acid in the presence of a water-miscible organic solvent to obtain an amino diol compound having in its free base form the formula,

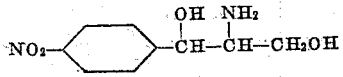

where R is a member of the class consisting of hydrogen, lower alkyl, phenyl and nitrophenyl.

2. Process for the production of nitrophenyl amino diol compounds, which comprises reacting a 1-aza-4-phenyl-3,7-dioxabicyclo[3.3.0]octane compound of formula,

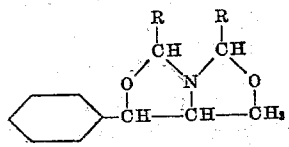

with fuming nitric acid under anhydrous conditions at a temperature below about 25° C. to obtain a 1-aza-4-(p-nitrophenyl)-3,7-dioxabicyclo[3.3.0]octane compound, subjecting the compound so obtained to hydrolysis with a dilute aqueous mineral acid in the presence of a water-miscible organic solvent; where R is a member of the class consisting of hydrogen, lower alkyl, phenyl and nitrophenyl.

3. Process according to claim 2 wherein R is hydrogen.

4. Process according to claim 2 wherein R is lower alkyl.

5. Process according to claim 2 wherein R is phenyl.

6. Process according to claim 2 wherein R is nitrophenyl.

7. Process for the production of D-(−)-threo-1-p-nitrophenyl-2-aminopropane-1,3-diol, which comprises reacting D-(+)-threo-1-aza-4-phenyl-3,7-dioxabicyclo[3.3.0]-octane with fuming nitric acid under anhydrous conditions at a temperature below about 25° C. to obtain D-(+)-threo-1-aza-4-(p-nitrophenyl)-3,7-dioxabicyclo[3.3.0]octane and subjecting said nitrophenyloctane to hydrolysis with a dilute mineral acid in the presence of a water-miscible organic solvent.

8. Process for the production of DL-threo-1-p-nitrophenyl-2-aminopropane-1,3-diol, which comprises reacting DL-threo-1-aza-4-phenyl-3,7-dioxabicyclo[3.3.0]octane with fuming nitric acid under anhydrous conditions at a temperature below about 25° C. to obtain DL-threo-1-aza-4-(p-nitrophenyl)-3,7-dioxabicyclo[3.3.0] octane and subjecting said nitrophenyloctane to hydrolysis with a dilute mineral acid in the presence of a water-miscible organic solvent.

9. Process for the production of nitrophenyl amino diol compounds, which comprises reacting a 1-aza-2,8-di(p-nitrophenyl)-4-phenyl-3,7-dioxabicyclo[3.3.0]octane compound of formula,

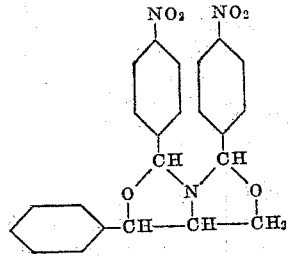

with nitric acid under anhydrous conditions at a temperature below about 25° C. thereby introducing a nitro group in the para position of the 4-phenyl ring, and reacting the product of nitration with dilute aqueous mineral acid in the presence of a water-miscible organic solvent to obtain an amino diol compound having in its free base form the formula,

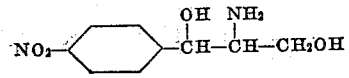

10. Process which comprises reacting 1-aza-4-phenyl-3,7-dioxabicyclo[3.3.0]-octane with fuming nitric acid under anhydrous conditions at a temperature below about 25° C. to obtain 1-aza-4-(p-nitrophenyl)-3,7-dioxabicyclo-[3.3.0] octane.

11. 1-aza-4-(p-nitrophenyl)-3,7-dioxabicyclo-[3.3.0] octane.

12. Process which comprises subjecting 1-aza-4-(p-nitrophenyl)-3,7-dioxabicyclo[3.3.0]octane to hydrolysis with a dilute mineral acid in the presence of a water-miscible organic solvent.

13. Process which comprises refluxing a mixture of 1-phenyl-2-aminopropane-1,3-diol and paraformaldehyde in benzene to obtain 1-aza-4-phenyl-3,7-dioxabicyclo[3.3.0]-octane, reacting said octane with fuming nitric acid under anhydrous conditions at a temperature below about 25° C. to obtain 1-aza-4-(p-nitrophenyl)-3,7-dioxabicyclo[3.3.0] octane, and subjecting said nitrophenyloctane to hydrolysis with a dilute mineral acid in the presence of a water-miscible organic solvent to obtain 1-(p-nitrophenyl)-2-aminopropane-1,3-diol.

14. Process which comprises reacting a 1-aza-4-phenyl-3,7-dioxabicyclo[3.3.0]octane compound of formula,

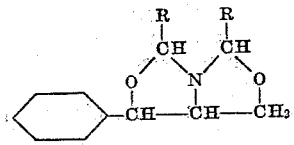

with nitric acid under anhydrous conditions at a temperature below about 25° C. to obtain a 1-aza-4-(p-nitrophenyl)-3,7-dioxabicyclo[3.3.0]octane compound of formula,

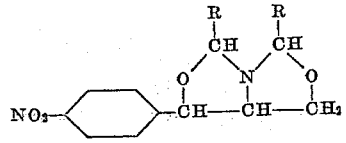

where R is a member of the class consisting of hydrogen, lower alkyl, phenyl and nitrophenyl.

15. Process which comprises subjecting a 1-aza-4-(p-nitrophenyl)-3,7-dioxabicyclo[3.3.0]octane compound of formula,

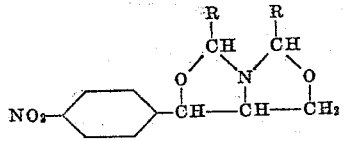

to hydrolysis with a dilute mineral acid in the presence of a water-miscible organic solvent where R is a member of the class consisting of hydrogen, lower alkyl, phenyl and nitrophenyl.

References Cited in the file of this patent

UNITED STATES PATENTS

| | | |
|---|---|---|
| 2,363,465 | Senkus | Nov. 21, 1944 |
| 2,448,890 | Johnson | Sept. 7, 1948 |

FOREIGN PATENTS

| | | |
|---|---|---|
| 882,550 | Germany | July 9, 1953 |